(12) United States Patent
Matsuda et al.

(10) Patent No.: US 8,450,982 B2
(45) Date of Patent: May 28, 2013

(54) CHARGE CONTROL CIRCUIT AND CHARGE CONTROLLING SEMICONDUCTOR INTEGRATED CIRCUIT

(75) Inventors: Hiroki Matsuda, Sagamihara (JP); Junji Takeshita, Isehara (JP); Yuji Yamanaka, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 549 days.

(21) Appl. No.: 12/409,214

(22) Filed: Mar. 23, 2009

(65) Prior Publication Data
US 2009/0237142 A1 Sep. 24, 2009

(30) Foreign Application Priority Data

Mar. 24, 2008 (JP) ................. 2008-075881

(51) Int. Cl.
*H02J 7/04* (2006.01)
*H02J 7/16* (2006.01)
*H02J 7/00* (2006.01)

(52) U.S. Cl.
USPC ........... 320/150; 320/151; 320/152; 320/153; 320/154; 320/160

(58) Field of Classification Search
CPC ...................................... H02J 7/0091
USPC ......................... 320/150, 152, 153
See application file for complete search history.

(56) References Cited

U.S. PATENT DOCUMENTS

| 6,020,721 | A * | 2/2000 | Brotto | 320/150 |
| 7,019,493 | B2 * | 3/2006 | Astala | 320/134 |
| 2002/0036482 | A1 * | 3/2002 | Nakatsuji | 320/152 |
| 2003/0090238 | A1 * | 5/2003 | Wolin et al. | 320/150 |
| 2004/0135552 | A1 * | 7/2004 | Wolin et al. | 320/150 |
| 2004/0135553 | A1 * | 7/2004 | Sakakibara | 320/150 |
| 2004/0145352 | A1 * | 7/2004 | Harrison | 320/150 |
| 2006/0082346 | A1 * | 4/2006 | Nagasawa | 320/150 |

(Continued)

FOREIGN PATENT DOCUMENTS

| JP | 6-022466 A | 1/1994 |
| JP | 2001-145274 A | 5/2001 |

(Continued)

OTHER PUBLICATIONS

Japanese Office Action dated Oct. 23, 2012 (and English translation thereof) in counterpart Japanese Application No. 2008-075881.

*Primary Examiner* — Drew A Dunn
*Assistant Examiner* — Nathaniel Pelton
(74) *Attorney, Agent, or Firm* — Holtz, Holtz, Goodman & Chick, P.C.

(57) ABSTRACT

A charge control circuit equipped with a function of controlling a charging current to be supplied to a secondary battery, comprises: a detecting unit for monitoring a temperature; and a charge control unit for controlling so as to break the charging current when the monitored temperature rises to a temperature equal to or more than a predetermined set temperature, decrease the charging current as the monitored temperature becomes higher when the monitored temperature is in a predetermined temperature range lower than the set temperature, flow the charging current having a predetermined current value in a state where the monitored temperature is lower than a lower limit temperature of the temperature range, or flow the charging current having a current value smaller than the current value when the monitored temperature is within a range of from an upper limit temperature of the temperature range to the set temperature.

6 Claims, 6 Drawing Sheets

U.S. PATENT DOCUMENTS

| | | | |
|---|---|---|---|
| 2006/0164041 A1* | 7/2006 | Ooshita et al. | 320/150 |
| 2008/0116851 A1* | 5/2008 | Mori | 320/134 |
| 2008/0212249 A1* | 9/2008 | Grewe et al. | 361/103 |
| 2008/0218127 A1* | 9/2008 | Kao et al. | 320/134 |
| 2008/0238362 A1* | 10/2008 | Pinnell et al. | 320/107 |
| 2008/0284379 A1* | 11/2008 | Hirano | 320/150 |
| 2009/0102428 A1* | 4/2009 | Aradachi et al. | 320/153 |
| 2009/0121685 A1* | 5/2009 | Eto | 320/152 |
| 2009/0206797 A1* | 8/2009 | Chueh et al. | 320/150 |

FOREIGN PATENT DOCUMENTS

| | | | |
|---|---|---|---|
| JP | 2006-1746 12 A | | 6/2006 |
| WO | WO/2007/122787 | * | 1/2007 |
| WO | WO/2007/114016 | * | 11/2007 |

* cited by examiner

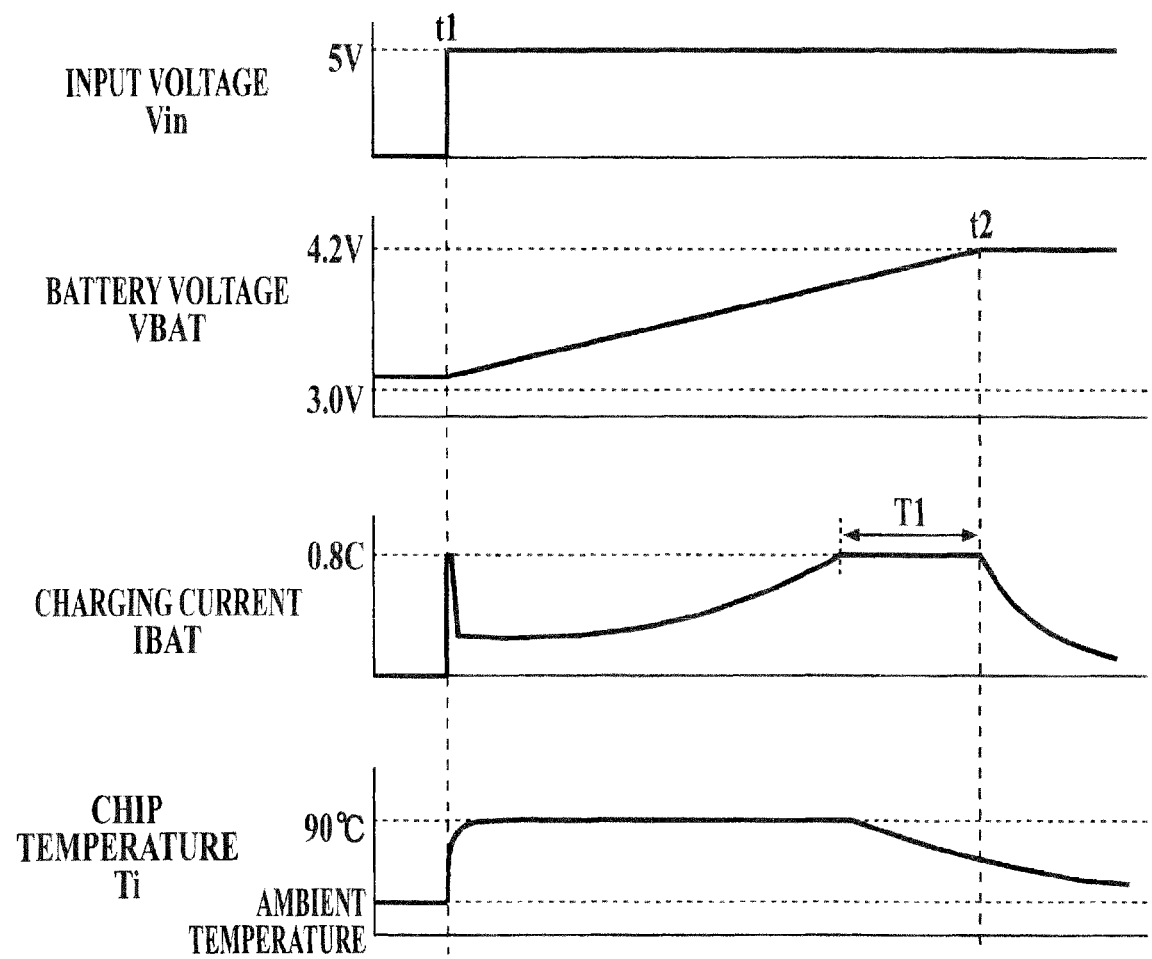

CHARGE CONTROL CIRCUIT AND CHARGE CONTROLLING SEMICONDUCTOR INTEGRATED CIRCUIT

BACKGROUND OF THE INVENTION

1. Field of the Invention

The present invention relates to a temperature rise suppressing technique of a secondary battery charging apparatus, and to a technique effective for the use of, for example, a charge control circuit and a charge controlling semiconductor integrated circuit (IC) equipped with the charge control circuit.

2. Related Art

A secondary battery charging apparatus uses an IC equipped with a charge control circuit to control a charging current for suppressing an unusual temperature rise in a battery or the inner part of an apparatus. As an invention pertaining to such a charging apparatus, for example, the invention described in Japanese Patent Application Laid-Open Publication No. 2001-145274 exists.

The invention provides a temperature detection unit in the inner part or in the neighborhood of a heat generating part the temperature of which rises most or a part having the smallest temperature margin, and if an output of the temperature detection unit exceeds a predetermined temperature, then the invention controls the charging current to a secondary battery to decrease or stop the charging current.

Moreover, some charging apparatus are provided with the function of suppressing any temperature rises by providing a temperature detecting element on a chip in order to prevent the lowering of the reliability and further the occurrence of troubles of the charging apparatus owing to the heat generation of charge controlling ICs themselves for controlling charging currents.

The conventional temperature rise suppressing technique of a charge controlling IC is only a simple one to break a charging current by turning off a current controlling transistor when a chip temperature exceeds a predetermined temperature, such as 150° C.

The control method can suppress the chip temperature not to exceed the set temperature by repeating the cycle of: temperature rise—charging current breaking—temperature lowering—charging current reopening—temperature rise.

However, since the control method completely breaks the charging current when the chip temperature exceeds the predetermined temperature, such as 150° C., the control method has the apprehension of causing the chattering phenomenon of: current breaking—current reopening—current breaking—current reopening because a large current abruptly flows through a current controlling transistor at the time of reopening a charging current next owing to a delay in response of a feedback control loop. Moreover it becomes clear that there is the problem of the apprehension of causing the characteristic degradation of a secondary battery and therefore shortening a battery life owing to the sudden influx of a large current into the secondary battery at the time of current reopening.

SUMMARY OF THE INVENTION

The present invention is directed to enable the avoidance of the causing of a chattering phenomenon of the turning on and off of a current owing to the seesaw movement of the temperature of a monitoring object in a charge control circuit and a charge controlling IC, both equipped with the function of controlling a charging current according to the temperature of a monitoring chip and the like.

The present invention is also directed to enable the prevention of the deterioration of the characteristics of a secondary battery owing to the sudden influx of a large current into the secondary battery at the time of current reopening in a charge control circuit and a charge controlling IC, both equipped with the function of controlling the turning on and off of a charging current according to the temperature of a monitoring chip and the like.

A first aspect of the present invention is a charge control circuit equipped with a function of controlling a charging current to be supplied to a secondary battery, comprising:

a temperature detecting unit for monitoring a temperature in the charge control circuit; and a charge control unit for controlling so as to break the charging current when a monitored temperature rises to a temperature equal to or more than a predetermined set temperature (e.g. 140° C.), decrease the charging current as the monitored temperature becomes higher when the monitored temperature is in a predetermined temperature range (e.g. 90° C. to 10° C.), which is lower than the set temperature of breaking the charging current, flow the charging current having a predetermined current value in a state in which the monitored temperature is lower than a lower limit temperature of the temperature range, or flow the charging current having a current value smaller than the predetermined current value when the monitored temperature is within a range of from an upper limit temperature of the temperature range to the set temperature of breaking the charging current.

BRIEF DESCRIPTION OF THE DRAWINGS

The above and other objects, advantages and features of the present invention will become more fully understood from the detailed description given below and the appended drawings, and the following descriptions pertain to the embodiment of the present invention are not intended to limit the present invention, and wherein:

FIG. 6 is a timing chart showing a charging operation of the charge controlling IC of the present embodiment, in which temperature current control is performed.

DETAILED DESCRIPTION OF THE PREFERRED EMBODIMENTS

In the following, a suitable embodiment of the present invention will be described with reference to the attached drawings.

Figure 1:
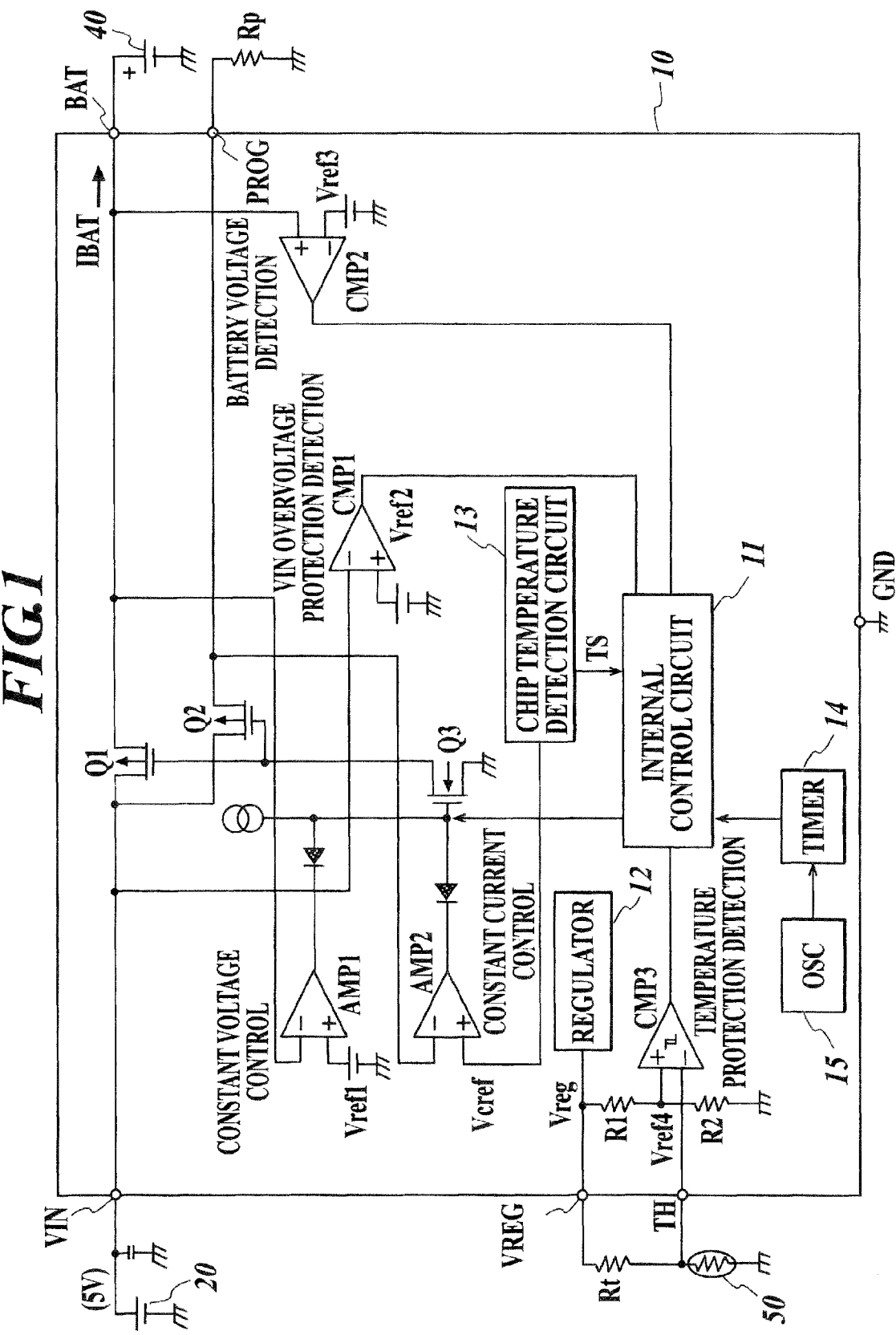
FIG. 1 is a configuration diagram showing the schematic configuration of a charge controlling IC as an example of an IC to which the present invention can be suitably applied.

FIG. 1 shows the schematic configuration of an embodiment of a charge controlling IC of a secondary battery to which the present invention can be suitably applied.

As shown in FIG. 1, the charge controlling IC 10 of this embodiment is equipped with a voltage input terminal VIN, to which a direct-current voltage is input from a direct-current power supply 20, such as an external AC adaptor, a battery terminal BAT, to which a secondary battery 40, such as a charging object lithium ion battery, is connected, a current controlling transistor Q1 provided between the voltage input terminal VIN and the battery terminal BAT, and a constant voltage control amplifier AMP1 to compare a battery voltage Vbat and a reference voltage Vref1 for performing constant voltage control to generate a gate control voltage of the transistor Q1.

Moreover, the charge controlling IC 10 is equipped with a monitoring transistor Q2, an external terminal PROG, and a constant current controlling amplifier AMP2. The monitoring transistor Q2 has the size of 1/N of that of the transistor Q1, a source terminal connected to the voltage input terminal VIN, and a control terminal (gate terminal), to which the same voltage as the one applied to the transistor Q1 is applied, in order to perform current control by detecting a current in proportion to the current flowing through the transistor Q1. The drain terminal of the transistor Q2 is connected to the external terminal PROG, and an external resistor Rp can be connected to the external terminal. PROG on the outside of the charge controlling IC 10. The constant current controlling amplifier AMP2 compares the voltage of the terminal PROG and a reference voltage Vcref to generate a gate control voltage of the transistor Q1 in order to perform constant current control.

Furthermore, the charge controlling IC 10 of the present embodiment is equipped with comparators CMP1, CMP2, and CMP3, and an internal control circuit 11. The comparator CMP1 compares a reference voltage Vref2 of, e.g. 5.8 V, and a direct-current voltage Vin input into the voltage input terminal VIN from the outside to detect abnormality in order to protect the chip from the direct-current voltage Vin The comparator CMP2 compares the voltage at the battery terminal BAT and a reference voltage Vref3. The comparator CMP3 compares the voltage at an external terminal TH, to which a temperature sensor 50, such as a thermistor, to detect the temperature in the neighborhood of the secondary battery 40 and the like are connected, and a reference voltage Vref4. The internal control circuit 11 judges whether the voltage of the monitoring object secondary battery 40 is an unusual voltage or not on the basis of the outputs of these comparators CMP1~CMP3 In the case of the unusual voltage, the internal control circuit 11 generates and outputs a voltage for controlling the gate of a transistor Q3 of an open collector, the drain of which is connected to the gate of the transistor Q1, in order to turn off the current controlling transistor Q1.

Moreover, the charge controlling IC 10 is provided with a regulator 12 to generate a constant voltage Vreg, which has no temperature dependency, and a chip temperature detection circuit 13 to detect a chip temperature. The chip temperature detection circuit 13 generates a signal to turn on the switching transistor Q3 when the chip temperature detection circuit 13 detects an unusual temperature, and the chip temperature detection circuit 13 generates the reference voltage Vcref to be supplied to the constant current controlling amplifier AMP2 according to a detected temperature.

The reference voltage Vref4 is generated by dividing the constant voltage Vreg generated by the regulator 12 with resistors R1 and P2. Moreover, the constant voltage Vreg is output to an external terminal VREG, to which a terminal of an external resistor Rt is connected, which external resistor Rt is connected to the temperature sensor 50 in series at the other terminal thereof. Furthermore, the charge controlling IC 10 is provided with a timer circuit 14 and an oscillating circuit 15. The timer circuit 14 is composed of a counter to time the time for managing a preliminary charging time, a rapid charging time, and the like. The oscillating circuit 15 generates an oscillated signal of a frequency, such as 64 kHz.

Figure 3:
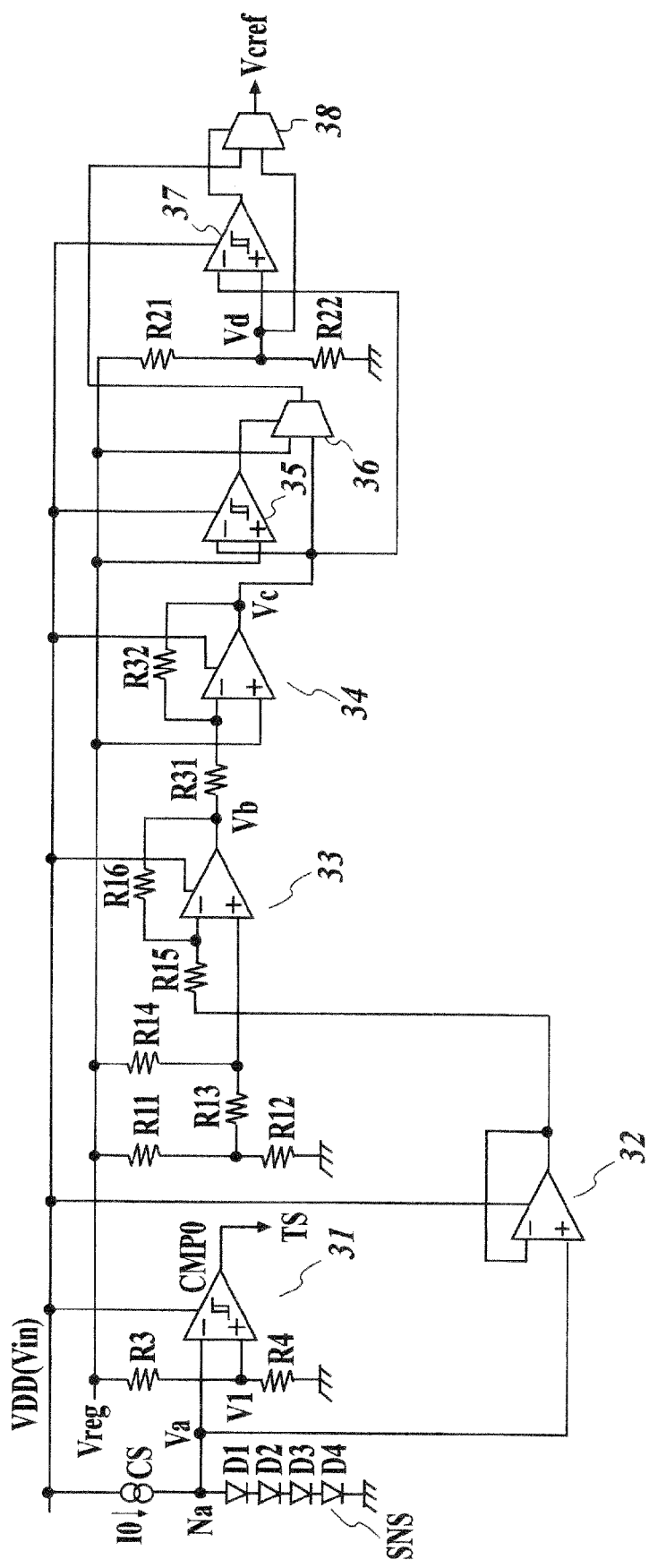
FIG. 3 is a circuit configuration diagram showing a concrete example of a chip temperature detection circuit.

FIG. 3 shows a concrete circuit configuration example of the chip temperature detection circuit 13.

The chip temperature detection circuit 13 of this embodiment includes a thermal shut-down detecting circuit 31. The thermal shut-down detecting circuit 31 includes a chip temperature detecting element SNS, a constant current source CS, resistors P3 and R4, and a comparator CMP0. The chip temperature detecting element SNS is composed of four diodes D1~D4 connected in series with each other. The diodes D1~D4 are formed on the chip and severally have a negative temperature characteristic. The constant current source CS is used to flow a current through the diode row. The resistors R3 and R4 divide the constant voltage Vreg. The comparator CMP0 compares a voltage V1 divided by the resistors P.3 and R4 with electric potential Va (=4 VF) at a connection node Na of the constant current source CS and the temperature detecting element SNS. The comparator CMPO has a hysteresis characteristic.

The current I0 of the constant current source CS and the resistance ratio of the resistors R3 and R4 are set so that the voltage V1 may become larger than 4× (forward voltage VF of each of the diodes D1~D4) when the chip temperature becomes higher than 140° C. Consequently, when the chip temperature becomes higher than 140° C., the output TS of the comparator CMPO changes to the high level, and the internal control circuit 11 detects the change to output a voltage to turn off the transistor Q3. Thereby, the current controlling transistor Q1 is turned off, and the charging current to be supplied to the secondary battery 40 is configured to be broken. Incidentally the diodes D1~D4 as the chip temperature detecting element SNS is desirably formed in the neighborhood of the current controlling transistor Q1, the heat generation quantity of which is the largest among all of the transistors Q1~Q3. The chip temperature detecting element corresponds to a temperature detecting unit for monitoring a temperature in the charge controlling IC (charge control circuit).

Moreover, the chip temperature detection circuit 13 is equipped with a voltage follower 32, a subtraction circuit 33, and an inverting amplifier 34. The voltage follower 32 performs the impedance conversion of the electric potential Va at the node Na to output the converted electric potential. The subtraction circuit 33 receives the input of the electric potential determined by the output electric potential of the voltage follower 32 and a resistor circuit composed of resistors R11~R14. The inverting amplifier 34 performs the inverting amplification of the output electric potential Vb of the subtraction circuit, 33.

Furthermore, a comparator 35, a selector 36, a comparator 37, and a selector 38 are provided at the subsequent stage of the inverting amplifier 34. The comparator 35 compares the output electric potential Vc of the inverting amplifier 34 and the constant voltage Vreg. The selector 36 is controlled on the basis of the output of the comparator 35 and transmits either of the output of the inverting amplifier 34 and the constant voltage Vreg (2.5 V) to the subsequent stage. The comparator 37 compares the output electric potential Vc of the inverting amplifier 34 and the voltage Vd obtained by dividing the constant voltage Vreg with resistors R21 and R22. The selector 38 is controlled on the basis of the output of the comparator 37 and outputs either of the output of the selector 36 and the voltage Vd as the reference voltage Vcref. The voltage Vd is set as the electric potential such as 0.5 V.

Next, the operation of the chip temperature detection circuit 13 configured as above is described with reference to FIGS. 4A and 4B.

Figure 4A:
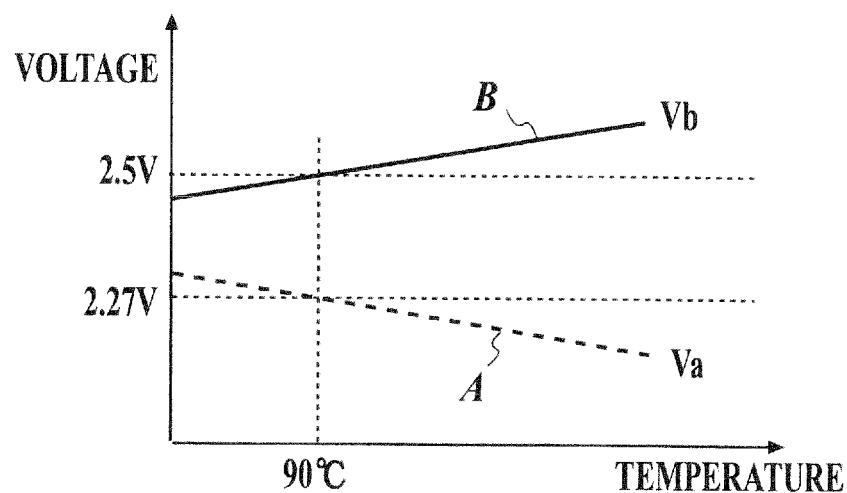
FIGS. 4A, 4B, and 4C are graphs showing voltage changes of the respective parts in the chip temperature detection circuit of FIG. 3.

Since the forward voltage VF of each of the diodes D1~D4 as the temperature detecting element has the negative temperature characteristic in the chip temperature detection circuit 13 of the present embodiment, the electric potential Va of the node Na changes along a straight line indicating the gradual lowering of the electric potential Va as the temperature becomes higher as shown by a broken line A in FIG. 4A. The electric potential Va is determined to be, for example, 2.27 V when the chip temperature is 90° C. On the other hand, since the subtraction circuit 33 outputs the electric potential that is a difference obtained by subtracting the electric potential Va from the electric potential determined by the resistor circuit composed of the resistors R11~R14, the output electric potential Vb changes along a straight line indicating the gradual rising of the output electric potential Vb as the temperature becomes higher as shown by a solid line B in FIG. 4A. The resistance values of the resistors R11~R14 are determined so that the output electric potential Vb, which is determined by the resistance ratios of these resistors R11~R14, may be 2.5 V when the chip temperature is 90° C.

Figure 4B:
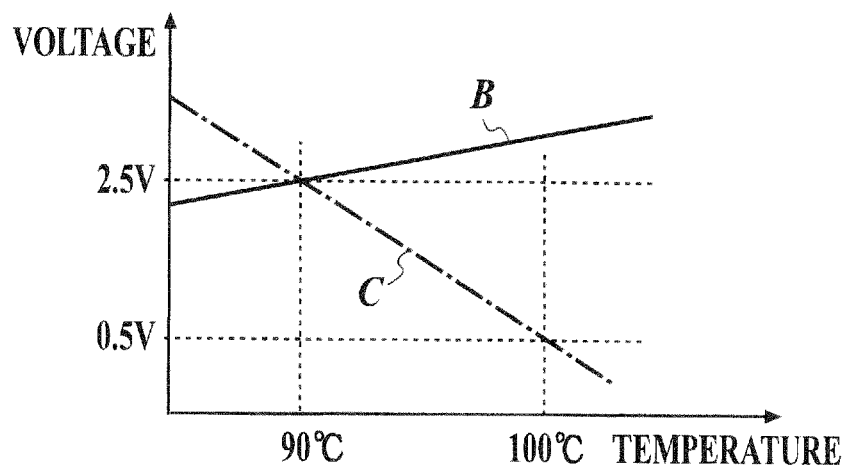

Since the output electric potential Vb of the subtraction circuit 33 is subjected to the inverting amplification of the inverting amplifier 34, the output electric potential Vc of the inverting amplifier 34 changes along a straight line indicating the passing-through of a point of 2.5 V at the time of the chip temperature of 90° C. and indicating the gradual lowering of the output electric potential Vc as the temperature becomes higher as shown by an alternate long and short dash line C in FIG. 4B. Moreover, the resistance ratio of the input resistor R31 and the feedback resistor R32 of the inverting amplifier 34 is set so that the output electric potential Vc of the inverting amplifier 34 becomes 0.5 V when the chip temperature is 100° C.

Figure 4C:
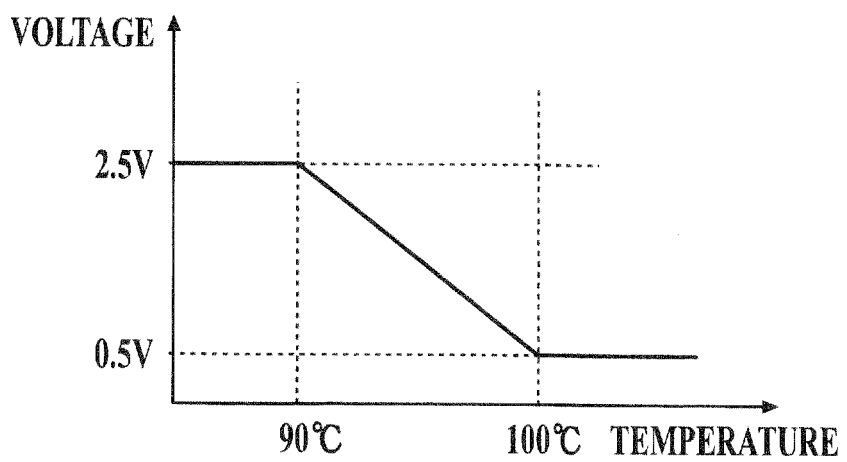

Then, the selector 36 at the subsequent stage selects the constant voltage Vreg, which is 2.5 V, when the output electric potential Vc of the inverting amplifier 34 is higher than 2.5 V. Moreover, the selector 36 selects the output electric potential Vc of the inverting amplifier 34 when the output electric potential Vc is lower than 2.5 V. Furthermore, the selector 38 selects the output electric potential Vc of the inverting amplifier 34 when the output electric potential Vc is higher than 0.5 V. Moreover, the selector 38 selects the voltage Vd, which is 0.5 V, when the output electric potential Vc of the inverting amplifier 34 is lower than 0.5 V. Consequently, the output reference voltage Vcref is the constant of 2.5 V when the temperature is 90° C. or lower; the output reference voltage Vcref changes along a straight line indicating the gradual lowering of the output reference voltage Vcref as the temperature becomes higher in the range of the temperature of from 90° C. to 100° C.; and the output reference voltage Vcref is the constant of 0.5 V when the temperature is 100° C. or higher, as shown in FIG. 4C.

Figure 2:
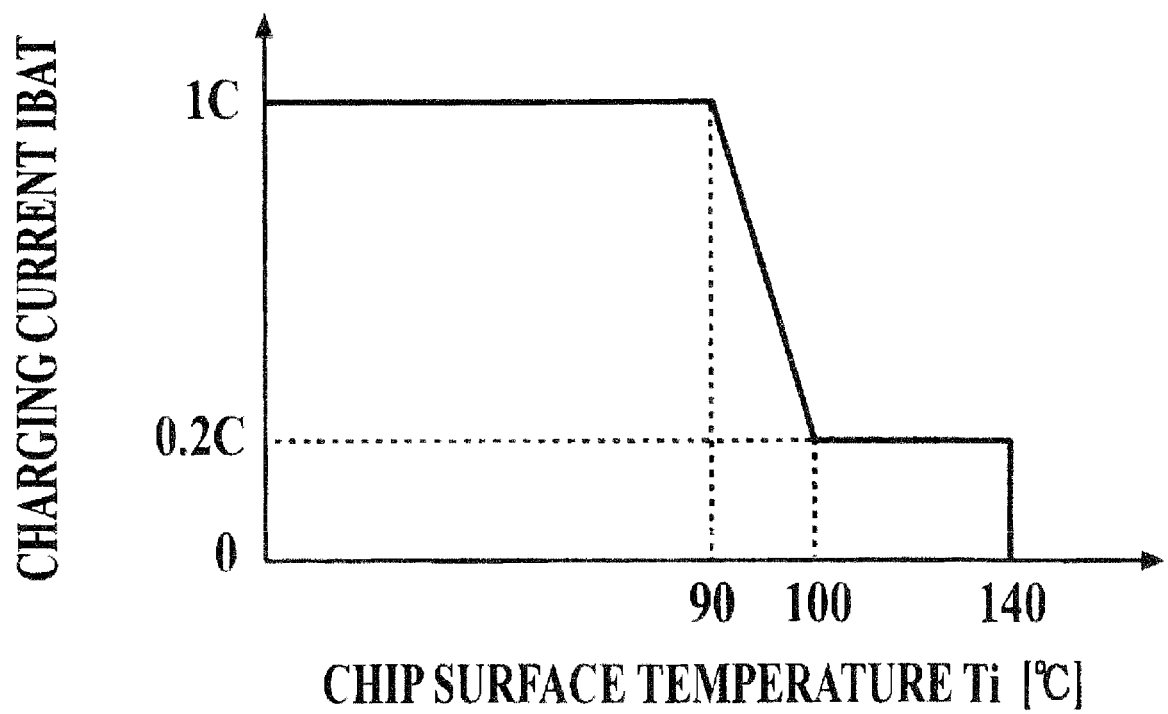
FIG. 2 is a graph showing a relation between chip temperatures and charging currents by the temperature charging current control of an embodiment of the present invention.

Furthermore, when the temperature exceeds 140° C., as described above, the current controlling transistor Q1 is broken on the basis of the output of the thermal shut-down detecting circuit 31, a charging current IBAT supplied to the secondary battery 40 by the transistor Q1 is controlled so as to be the constant of 0.8 C when the temperature is 90° C. or lower, to change along a straight line indicating the gradual lowering of the charging current IBAT as the temperature rises when the temperature is within a range of from 90° C. to 100° C., to be the constant of 0.2 C when the temperature is within a range of from 100° C. to 140° C., and to be zero when the temperature is 140° C. or higher, as shown in FIG. 2.

Incidentally, the charging of 0.8 C means to charge the secondary battery 40 with a current value of 80% of a rated current (1 C), which is determined by the characteristics of the secondary battery 40, here. The reason why the charging current IBAT is controlled to be the constant of not 1 C but 0.8 C is that the deterioration of the secondary battery 40 caused by the repetition of charging is considered. Moreover, if the charging current IBAT is small, then the charging time becomes longer. Consequently, it is desirable to perform the charging with an arbitrary constant current within a range of from 0.7 C to 1 C when the temperature is 90° C. or lower in connection with the charging time. Moreover, the temperatures of 90° C. and 100° C., which give the timing of switching the control, are determined according to the characteristics of the IC to be used and the secondary battery 40 of the charging object, and consequently it is needless to say that the present invention is not limited to such temperatures.

Moreover, although the temperature range in which the charging current IBAT is changed is set to the range of from 90° C. to 100° C. in the embodiment described above, the range is not limited to the above one. The lower limit temperature of a desirable temperature range is within a range of from 80° C. to 100° C., and the upper limit temperature of the desirable temperature range is within a range of 90° C. to 120° C. The temperature difference of the temperature range is 5° C. or more and 20° C. or less, and the furthermore desirable temperature difference is 8° C. or more and 15° C. or less. Furthermore, although the charging current IBAT is changed from 0.8 C to 0.2 C during a temperature change of 10° C. in the embodiment described above, that is, the current rate of change is 0.06 C/° C., but the current rate of change is not limited to this example. The desirable current rate of change is within a range of from 0.04 C/° C. to 0.08 C/° C. By setting the current rate of change to such a condition, the chip temperature of under charging can be kept in a desired range.

Figure 5:
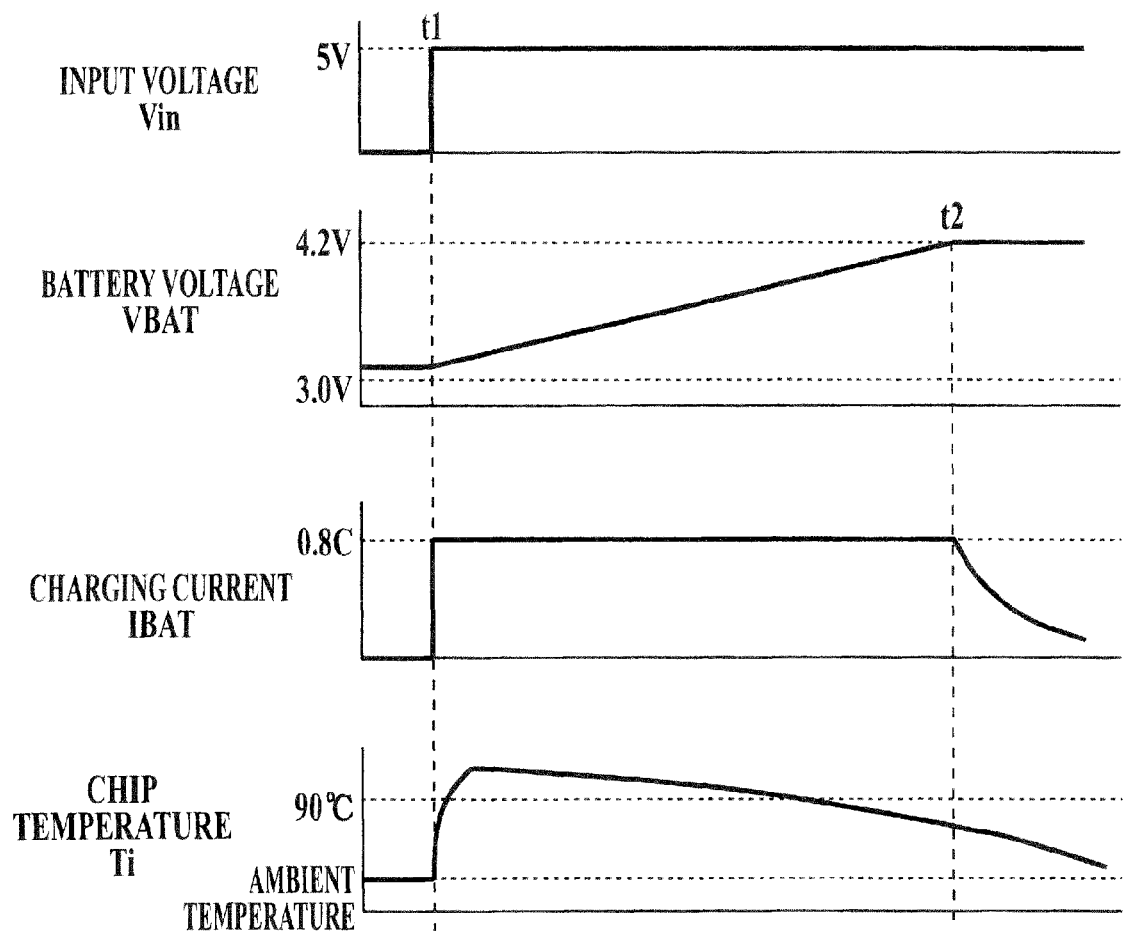
FIG. 5 is a timing chart showing a charging operation of a charge controlling IC that does not perform any temperature current control.

Next, the charging operation (see FIG. 6) of the charge controlling IC 10 of the present embodiment, which includes the chip temperature detection circuit 13 as shown in FIG. 3 and performs the temperature current control as shown in FIG. 2, is described while comparing the charging operation with that (see FIG. 5) of the charge control circuit having only the thermal shut-down detecting circuit. The thermal shut-down detection is the function of fail safe, which rarely operate in an ordinary charging operation, and the following description will be performed on the supposition that no thermal shut-down is caused. Incidentally, the chip temperature in FIG. 6 is a mean temperature of the chip, and the local chip temperature at the position where the temperature detecting diodes D1~D4 are formed is higher than the chip temperature shown in FIG. 6.

In the charging operation (see FIG. 5) of the conventional charge control circuit, which does not perform any temperature current control, the charging current IBAT of 0.8 C begins to flow immediately after the application of an input direct-current voltage Vin from an adaptor or the like (timing t1); a battery voltage VBAT gradually rises by the charging of constant current control; and the constant current control is changed to constant voltage control when the battery voltage VBAT reaches a predetermined constant voltage of 4.2 V or the like (timing t2). Thereby, the charging current IBAT decreases, and the chip temperature also lowers. However, since the chip temperature exceeds 90° C. during the charging by the constant current control and the chip temperature can exceed 140° C. in some ambient temperature of the apparatus, the thermal shut-down detecting circuit 31 operates to break the charging current IBAT in such a case.

On the other hand, in a charging operation by the charging controlling IC 10 of the present embodiment, in which temperature current control is performed, as shown in FIG. 6, the charging current IBAT of 0.8 C once flows by the application of the input direct-current voltage Vin (timing t1), but the charging current IBAT is decreased when the chip temperature rises by the charging current IBAT to exceed 90° C. Consequently, the charging is performed in the neighborhood of the chip temperature of 90° C. After that, when the charging current IBAT increases to reach 0.8 C, the charging operation changes to the one by the constant current control (in period T1). Furthermore when the battery voltage VBAT reaches the predetermined constant voltage, such as 4.2 V, after that, then the charging is switched to the one by the constant voltage control (timing t2).

Incidentally, after the change of the charging to that by the constant voltage control, for example, the following control is performed. That is, the end of the charging is judged after an elapse of a predetermined time by the use of the timer circuit 14. Alternatively, since the charging current IBAT gradually decreases by the constant voltage control, the decrease is monitored, and the end of the charging is judged at the time when the charging current IBAT becomes, for example, 0.1 C or less, or the time point after a predetermined time of the reaching of the charging current IBAT to 0.1 C. Then the current controlling transistor Q1 is turned off.

As described above, in a charging operation of the charge controlling IC 10 of the present embodiment, when the chip temperature rises to exceed 90° C., the charging current IBAT decreases, and consequently the rise of the chip temperature is suppressed. Consequently, the fail safe function by the thermal shut-down detecting circuit rarely operates, and the occurrence of the chattering phenomenon of sudden chip temperature rise and charging current breaking owing to the breaking and reopening of the charging current IBAT by chip temperature rising is avoided. Consequently, the situation in which the sudden influx of a large current into the secondary battery 40 at the time of current reopening advances the characteristic degradation of the secondary battery 40 can be also prevented.

In the above, one embodiment of the present invention has been described, but the present invention is not limited to the aforesaid embodiment, and various changes can be performed on the basis of the spirit of the present invention. For example, although the diodes D1~D4 are used as the chip temperature detecting element SNS in the embodiment described above, the PN junctions between the bases and the emitters of NPN transistors may be used as the chip temperature detecting element SNS. Moreover, although the chip temperature detecting element SNS is provided to perform temperature control against the rise of the chip temperature in the embodiment described above, the current control described in the embodiment described above may be performed in accordance with a voltage from the thermistor to detect a battery temperature.

Furthermore, although the chip temperature detection circuit 13 in FIG. 3 is provided with the comparators 35 and 37 and the selectors 36 and 38 in order to output the voltages of 2.5 V (constant) at 90° C. or less and 0.5 V (constant) at 100° C. or more, the chip temperature detection circuit 13 may be configured to be provided with a clamp section composed of a diode or the like in place of the comparators 35 and 37 and the selector 36 and 38 to clamp output voltages, and to output the voltage of the output waveform similar to that of the embodiment.

A first aspect of the present invention is a charge control circuit equipped with a function of controlling a charging current to be supplied to a secondary battery, comprising:

a temperature detecting unit for monitoring a temperature in the charge control circuit; and a charge control unit for controlling so as to break the charging current when a monitored temperature rises to a temperature equal to or more than a predetermined set temperature (e.g. 140° C.), decrease the charging current as the monitored temperature becomes higher when the monitored temperature is in a predetermined temperature range (e.g. 90° C. to 100° C.), which is lower than the set temperature of breaking the charging current, flow the charging current having a predetermined current value in a state in which the monitored temperature is lower than a lower limit temperature of the temperature range, or flow the charging current having a current value smaller than the predetermined current value when the monitored temperature is within a range of from an upper limit temperature of the temperature range to the set temperature of breaking the charging current.

To put it more concretely, the charge controlling semiconductor integrated circuit comprises:

a current controlling transistor provided between a voltage input terminal and an output terminal;

a control circuit for controlling the current controlling transistor to control a charging current to be supplied to a secondary battery; and a chip temperature detection circuit equipped with a temperature detecting element to detect a chip temperature, the chip temperature detection circuit outputting a voltage according to a detected temperature, wherein the charge the control circuit is configured to control the current controlling transistor so as to decrease the charging current as the chip temperature becomes higher when the chip temperature is within a predetermined temperature range lower than a set temperature of breaking the charging current, flow the charging current having a predetermined current value when the chip temperature is lower than a lower limit temperature of the temperature range, and flow the charging current having a value smaller than the predetermined current value when the chip temperature is within a range of from an upper limit temperature of the temperature range to the set temperature of breaking the charging current.

According to the configuration like this, since the charging current is decreased and it becomes difficult for the monitored temperature, such as the chip temperature, to rise when the monitored temperature becomes the predetermined temperature or more, which predetermined temperature is lower than the set temperature of breaking the charging current, the occurrence of the chattering phenomenon of turning on and off the charging current can be avoided. Moreover, the current reopening frequency of a sudden influx of a large current into the secondary battery can be decreased, and thereby the characteristic degradation of the secondary battery can be prevented.

It is desirable here that the charge controlling semiconductor integrated circuit further comprises a constant current controlling amplifier for controlling a control voltage so that a voltage according to an output charging current may be fed back and a constant current may flow through the current controlling transistor, wherein the charge controlling semiconductor integrated circuit is configured so that an output voltage of the chip temperature detection circuit may be supplied to the constant current controlling amplifier as a reference side voltage Thereby the secondary battery can be charged by the predetermined current within the range in which the chip temperature does not exceed the predetermined temperature.

Moreover, the charge controlling semiconductor integrated circuit is configured so that the lower limit temperature of the temperature range may be within a range of from 80° C. to 100° C., the upper limit temperature of the temperature range may be within a range of from 90° C. to 120° C., and a temperature difference of the temperature range may be within a range of from 5° C. to 20° C., both inclusive.

Alternatively, the charge controlling semiconductor integrated circuit is configured so that a rate of change of the charging current in the temperature range may be within a range of from 0.04 C/° C. to 0.08 C/° C. Thereby, the chip temperature can be kept in the predetermined range in ordinary charging.

Furthermore, it is desirable that the charge controlling semiconductor integrated circuit is configured so that the chip temperature detection circuit may be provided with a voltage comparing circuit to output a signal to control the current controlling transistor not to flow any currents therethrough when a voltage generated by the temperature detecting element becomes lower than a predetermined constant voltage or higher than a predetermined constant voltage. Thereby, the charging current can be broken when the chip temperature becomes unusually high.

Moreover, the charge controlling semiconductor integrated circuit is configured, so as to be provided with a current monitoring transistor, which has the same structure as that of the current controlling transistor but is formed to be smaller in size than that of the current controlling transistor, the current monitoring transistor being subjected to the application of the same control voltage as that of the current controlling transistor, so that a voltage generated by the current monitoring transistor is fed back to the constant current controlling amplifier and a control voltage according to a potential difference between the fed back voltage and the reference side voltage is generated to be supplied to the current controlling transistor.

Since the current flowing through the current controlling transistor is detected with the current monitoring transistor, the power loss of the charge controlling semiconductor integrated circuit can be decreased in comparison with the case of connecting a resistor in series with the current controlling transistor.

Furthermore, the charge controlling semiconductor integrated circuit may be configured so as to further comprise:

a constant voltage control amplifier to receive a voltage at the output terminal to generate a voltage according not a potential difference between the received voltage and a predetermined reference voltage, the constant voltage control amplifier outputting a voltage for performing constant voltage control of the current controlling transistor; and a voltage detecting circuit to detect whether the voltage at the output terminal reaches a predetermined voltage or not, wherein the charge controlling semiconductor integrated circuit controls the current controlling transistor on the basis of an output of the constant current controlling amplifier before the voltage at the output terminal reaches the predetermined voltage, and controls the current controlling transistor on the basis of an output of the constant voltage control amplifier after the voltage at the output terminal has reached the predetermined voltage.

Thereby, the charge controlling semiconductor integrated circuit can perform charging at a predetermined low voltage when the chip temperature is higher than the temperature range.

Furthermore, the charge controlling semiconductor integrated circuit is configured so that the chip temperature detection circuit may include:

a subtraction circuit for subtracting a voltage generated by the temperature detecting element from a predetermined voltage;

an inverting amplifying circuit for performing inverting amplification of an output of the subtraction circuit;

a first comparator for comparing an output of the inverting amplifying circuit with a first voltage;

a first selection section controlled by an output of the first comparator to selectively transmit either of the output of the inverting amplifying circuit and the first voltage to a subsequent stage, the first selection section outputting the output of the inverting amplifying circuit when the output of the inverting amplifying circuit is lower than the first voltage and outputting the first voltage when the output of the inverting amplifying circuit is higher than the first voltage;

a second comparator for comparing the output of the inverting amplifying circuit with a second voltage lower than the first voltage;

a second selection section controlled by an output of the second comparator to selectively transmit either of the output of the inverting amplifying circuit and the second voltage to a subsequent stage, the second selection section outputting the output of the inverting amplifying circuit when the output of the inverting amplifying circuit is higher than the second voltage and outputting the second voltage when the output of the inverting amplifying circuit is lower than the second voltage.

Thereby, a charge control circuit capable of charging in a desired temperature range of the chip temperature thereof can be designed comparatively easily.

According to the present invention, in a charge control circuit or a charge controlling IC that is equipped with the function of controlling a charging current according to the temperature of a monitored chip or the like, the occurrence of a chattering phenomenon of turning on and off the charging current by a seesaw movement of the temperature of a monitoring object can be avoided. Moreover, the present invention also has the advantage capable of preventing the deterioration of the characteristics of the secondary battery owing to the sudden influx of a large current into the secondary battery at the time of current reopening.

Although the example of applying the present invention to the charge controlling IC of a secondary battery has been described in the above description, the present invention is not limited such an example, but the present invention can be applied to a direct-current power supply circuit, such as a DC-DC converter and a low saturating type series regulator (LDO), and a multi-function power source controlling IC, such as a power management IC equipped with a plurality of power source series circuits, such as a white light emitting diode (WLED) in addition to the charge control circuit of a secondary battery.

The entire disclosure of Japanese Patent Applications No. 2008-075881 filed on Mar. 24, 2008 including specifications, claims, drawings and summaries are incorporated herein by reference in their entirety.

What is claimed is:

1. A charge controlling semiconductor integrated circuit, comprising:
    a current controlling transistor provided between a voltage input terminal and an output terminal;
    a control circuit which controls the current controlling transistor to control a charging current to be supplied to a secondary battery; and
    a chip temperature detection circuit provided with a temperature detecting element to detect a chip temperature, the chip temperature detection circuit outputting a voltage according to a detected temperature,
    wherein the control circuit controls the current controlling transistor so as to:
    (i) decrease the charging current in accordance with an increase in the chip temperature when the chip temperature is within a predetermined temperature range lower than a set temperature of breaking the charging current;
    (ii) flow the charging current having a predetermined current value when the chip temperature is lower than a lower limit temperature of the temperature range; and
    (iii) flow the charging current having a value smaller than the predetermined current value when the chip temperature is within a range from an upper limit temperature of the temperature range to the set temperature of breaking the charging current, and
    wherein the chip temperature detection circuit includes:
    a subtraction circuit which subtracts a voltage generated by the temperature detecting element from a predetermined voltage;
    an inverting amplifying circuit which performs inverting amplification of an output of the subtraction circuit;
    a first comparator which compares an output of the inverting amplifying circuit with a first voltage;
    a first selection section controlled by an output of the first comparator to selectively transmit either of the output of the inverting amplifying circuit and the first voltage to a subsequent stage, the first selection section outputting the output of the inverting amplifying circuit when the output of the inverting amplifying circuit is lower than the first voltage and outputting the first voltage when the output of the inverting amplifying circuit is higher than the first voltage;
    a second comparator which compares the output of the inverting amplifying circuit with a second voltage lower than the first voltage; and
    a second selection section controlled by an output of the second comparator to selectively transmit either of the output of the inverting amplifying circuit and the second voltage to a subsequent stage, the second selection section outputting the output of the inverting amplifying circuit when the output of the inverting amplifying circuit is higher than the second voltage and outputting the second voltage when the output of the inverting amplifying circuit is lower than the second voltage.

2. The charge controlling semiconductor integrated circuit according to claim 1, wherein the temperature detecting element comprises one of a diode and an NPN transistor.

3. The charge controlling semiconductor integrated circuit according to claim 1, further comprising a constant current controlling amplifier for controlling a control voltage so that a voltage according to an output charging current may be fed back and a constant current may flow through the current controlling transistor,
    wherein the charge controlling semiconductor integrated circuit is configured so that an output voltage of the chip temperature detection circuit may be supplied to the constant current controlling amplifier as a reference side voltage.

4. The charge controlling semiconductor integrated circuit according to claim 1, wherein the lower limit temperature of the temperature range is within a range of 80° C. to 100° C., the upper limit temperature of the temperature range is within a range of 90° C. to 120° C., and a temperature difference of the temperature range is within a range of 5° C. to 20° C., both inclusive.

5. The charge controlling semiconductor integrated circuit according to claim 3, wherein a rate of change of the charging current in the temperature range is within a range of 0.04 C/° C. to 0.08 C/° C.

6. The charge controlling semiconductor integrated circuit according to claim 1, wherein the chip temperature detection circuit is provided with a voltage comparing circuit to output a signal to control the current controlling transistor not to flow any currents therethrough when a voltage generated by the temperature detecting element becomes lower than a predetermined constant voltage or higher than a predetermined constant voltage.

* * * * *